United States Patent
Li et al.

(10) Patent No.: US 12,108,307 B2
(45) Date of Patent: Oct. 1, 2024

(54) COMMUNICATIONS METHOD, APPARATUS AND SYSTEM

(71) Applicant: Huawei Technologies Co., Ltd., Shenzhen (CN)

(72) Inventors: Meng Li, Hangzhou (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 196 days.

(21) Appl. No.: 17/331,303

(22) Filed: May 26, 2021

(65) Prior Publication Data

US 2021/0281981 A1 Sep. 9, 2021

Related U.S. Application Data

(63) Continuation of application No. PCT/CN2019/106197, filed on Sep. 17, 2019.

(30) Foreign Application Priority Data

Nov. 27, 2018 (CN) .......................... 201811429322.2

(51) Int. Cl.
*H04W 4/00* (2018.01)
*H04W 4/02* (2018.01)
(Continued)

(52) U.S. Cl.
CPC ............. *H04W 4/06* (2013.01); *H04W 4/02* (2013.01); *H04W 76/11* (2018.02); *H04W 76/15* (2018.02)

(58) Field of Classification Search
CPC ......... H04W 4/06; H04W 4/02; H04W 76/11; H04W 16/18; H04W 88/18
See application file for complete search history.

(56) References Cited

U.S. PATENT DOCUMENTS 8,929,890 B2 * 1/2015 Lim ................. H04W 72/30
455/435.1
10,735,912 B2 * 8/2020 Adachi ................. H04W 8/24
(Continued)

FOREIGN PATENT DOCUMENTS

CN 1645798 A 7/2005
CN 101163320 A 4/2008
(Continued)

OTHER PUBLICATIONS

Huawei et al., "Solution for Group Communication for IoT-V2X SIDs", Sa WG2 Meeting #128bis, S2-188387, Sophia Antipolis, France, Aug. 20-24, 2018, 13 pages.
(Continued)

*Primary Examiner* — Omoniyi Obayanju
(74) *Attorney, Agent, or Firm* — Slater Matsil, LLP

(57) ABSTRACT

Embodiments of this application disclose a communications method, apparatus, and system. Specifically, after receiving information about a multicast area from a sender of a multicast service, a first core network device in a first network obtains, based on the information, indication information indicates that the first network cannot support the multicast service in the multicast area, or indicates that the first network supports the multicast service in a portion of areas of the multicast area; and sends the indication information to the sender. In this way, the sender of the multicast service can determine whether the first network supports the multicast service in the multicast area.

18 Claims, 9 Drawing Sheets

(51) Int. Cl.
*H04W 4/06* (2009.01)
*H04W 76/11* (2018.01)
*H04W 76/15* (2018.01)

(56) References Cited

U.S. PATENT DOCUMENTS

| | | | |
|---|---|---|---|
| 2005/0041608 A1* | 2/2005 | Jeong | H04L 12/189 370/310 |
| 2006/0104225 A1 | 5/2006 | Kim et al. | |
| 2007/0201413 A1 | 8/2007 | Laine et al. | |
| 2018/0092133 A1 | 3/2018 | Starsinic et al. | |
| 2021/0258744 A1* | 8/2021 | Lee | H04W 76/14 |

FOREIGN PATENT DOCUMENTS

| | | |
|---|---|---|
| CN | 102056082 A | 5/2011 |
| CN | 102769825 A | 11/2012 |
| CN | 103581833 A | 2/2014 |
| CN | 107087442 A | 8/2017 |
| CN | 107770727 A | 3/2018 |
| IN | 101166311 A | 4/2008 |
| WO | 2017171297 A1 | 10/2017 |

OTHER PUBLICATIONS

3GPP TS 23.468 V15.0.0 (Dec. 2017), 3rd Generation Partnership Project; Technical Specification Group Services and System Aspects; Group Communication System Enablers for LTE (GCSE_LTE); Stage 2 (Release 15), 32 pages.

Huawei et al., "KI#14: Update of Solution #B2", SA WG2 Meeting #129, S2-1810639, Dongguan, China, Oct. 15-19, 2018, 18 pages.

3GPP TS 23.246 V15.0.0 (Dec. 2017), 3rd Generation Partnership Project; Technical Specification Group Services and System Aspects; Multimedia Broadcast/Multicast Service (MBMS); Architecture and functional description (Release 15), 77 pages.

3GPP TR 23.786 V0.8.0 (Aug. 2018), 3rd Generation Partnership Project; Technical Specification Group Services and System Aspects; Study on architecture enhancements for EPS and 5G System to support advanced V2X services (Release 16), 78 pages.

3GPP TS 23.682 V16.0.0 (Sep. 2018), 3rd Generation Partnership Project; Technical Specification Group Services and System Aspects; Architecture enhancements to facilitate communications with packet data networks and applications (Release 16), 126 pages.

Samsung, "5G MBMS Procedure", 3GPP SA WG2 Meeting #129, S2-1810311, Oct. 8, 2018, Dongguan, China, Oct. 15-29, 2018, 12 pages.

\* cited by examiner

COMMUNICATIONS METHOD, APPARATUS AND SYSTEM

CROSS-REFERENCE TO RELATED APPLICATIONS

This application is a continuation of International Application No. PCT/CN2019/106197, filed on Sep. 17, 2019, which claims priority to Chinese Patent Application No. 201811429322.2, filed on Nov. 27, 2018. The disclosures of the aforementioned applications are hereby incorporated by reference in their entireties.

TECHNICAL FIELD

This application relates to the field of communications technologies, and in particular, to a communications method, apparatus, and system.

BACKGROUND

To promote development of a multicast (also referred to as multicast/broadcast) technology, in a 5th generation communication technology (5G) network, a session management function and a service management function in a multimedia broadcast multicast service (MBMS) system are separated from each other, a multicast/broadcast-service control (MB-service control) entity is used to implement the service management function, and an enhanced multicast/broadcast-session management (MB-SMF) entity is used to implement the session management function.

In addition, in the 5G network, a radio access network (RAN) device and a user plane function (UPF) entity further need to be enhanced, to support a multicast service.

However, in actual application, an operator cannot quickly deploy a multicast system of the 5G network across an entire network, and an application server (that is, a sender of the multicast service) cannot determine an area in which the multicast system of the 5G network has been deployed.

SUMMARY

This application provides a communications method, apparatus, and system, to resolve a problem that in a scenario in which an operator does not deploy a multicast system of a 5G network across an entire network, an application server cannot determine an area in which the multicast system of the 5G network has been deployed.

To achieve the foregoing objective, the following technical solutions are used in the embodiments of this application.

According to a first aspect, a communication method is provided. After receiving information about a multicast area that is sent by a sender of a multicast service, a first core network device (the first core network device belongs to a first network) obtains, based on the information about the multicast area, indication information that is used to indicate that the first network cannot support the multicast service in the multicast area, or is used to indicate that the first network supports the multicast service in a portion of areas of the multicast area; and sends the indication information to the sender. In this way, the sender can determine whether the first network supports the multicast service of the sender in the multicast area.

In a possible implementation of this application, the information about the multicast area is carried in a first message, and the first message is used to request to establish a first multicast session in the multicast area.

In another possible implementation of this application, the indication information in this application includes information about a first area or includes information about a second area. The first area herein is an area in which the first network supports the multicast service in the multicast area, and the second area is an area in which the first network does not support the multicast service in the multicast area. In this scenario, the indication information is used to indicate that the first network supports the multicast service in the portion of areas of the multicast area.

In another possible implementation of this application, in a scenario in which the indication information includes the information about the first area or includes the information about the second area, the indication information may further include information about a second multicast session. The second multicast session is a multicast session established in the first area, and the second multicast session belongs to the first network.

In another possible implementation of this application, in a scenario in which the indication information includes the information about the first area (or the information about the second area) and the information about the second multicast session, a method in which "a first core network device obtains, based on the information about the multicast area, indication information" in the foregoing is as follows: The first core network device obtains, based on the information about the multicast area, the information about the first area/the information about the second area; after obtaining the information about the first area/the information about the second area, the first core network device sends a second message to a second core network device that belongs to the first network to request to establish the second multicast session in the first area; and subsequently the first core network device receives the information about the second multicast session from the second core network device. In this way, the first core network device can obtain the information about the first area (or the information about the second area) and the information about the second multicast session.

In this scenario, the information about the first area (or the information about the second area) and the information about the second multicast session may be carried in different messages, or may be carried in a same message.

After obtaining the information about the first area/the information about the second area, the first core network device triggers establishment of the second multicast session in the first area, thereby effectively reducing an operation performed by the sender after the sender receives the indication information, and improving communication efficiency. If the information about the first area (or the information about the second area) and the information about the second multicast session are carried in the same message, message transmission can be further reduced effectively, reducing resource usage.

In another possible implementation of this application, the indication information in this application includes information about a first area and information about a third area. The first area herein is an area in which the first network supports the multicast service in the multicast area, and the third area is an area in which a second network supports the multicast service in the multicast area. In this scenario, the indication information is used to indicate that the first network supports the multicast service in the portion of areas of the multicast area.

In another possible implementation of this application, in a scenario in which the indication information includes the information about the first area and the information about the third area, a method in which "a first core network device obtains, based on the information about the multicast area, indication information" in the foregoing is as follows: The first core network device obtains, based on the information about the multicast area, the information about the first area/information about a second area; after obtaining the information about the first area/the information about the second area, the first core network device sends a third message to a third core network device that belongs to the second network to request to obtain the information about the third area; and subsequently the first core network device receives the information about the third area from the third core network device.

That the indication information includes the information about the first area and the information about the third area indicates that neither a multicast system of the first network nor a multicast system of the second network is deployed across an entire network. In a scenario in which neither the multicast system of the first network nor the multicast system of the second network is deployed across the entire network, the communication method provided in this application can also implement transmission of multicast service data, and has relatively high practicability.

In another possible implementation of this application, the indication information in this application includes information about a third multicast session. The third multicast session is a multicast session established in the multicast area, and the third multicast session belongs to a second network.

In another possible implementation of this application, in a scenario in which the indication information includes the information about the third multicast session, a method in which "a first core network device obtains, based on the information about the multicast area, indication information" in the foregoing is as follows: The first core network device obtains, based on the information about the multicast area, information about a first area/information about a second area, where the first area herein is an area in which the first network supports the multicast service in the multicast area, and the second area is an area in which the first network does not support the multicast service in the multicast area; the first core network device sends, based on the obtained information about the first area/the information about the second area, a fourth message to a third core network device that belongs to the second network to request to establish the third multicast session in the multicast area; and subsequently the first core network device receives the information about the third multicast session from the third core network device.

It is easily understood that, if the first core network device sends the information about the third multicast session to the sender, the sender directly broadcasts based on the information about the third multicast session, thereby effectively reducing an operation of the sender.

In another possible implementation of this application, the indication information in this application includes information about a second multicast session and information about a fourth multicast session. The second multicast session is a multicast session established in a first area, and the second multicast session belongs to the first network. The fourth multicast session is a multicast session established in a second area, and the fourth multicast session belongs to a second network. The first area is an area in which the first network supports the multicast service in the multicast area. The second area is an area in which the first network does not support the multicast service in the multicast area. In this scenario, the indication information is used to indicate that the first network supports the multicast service in the portion of areas of the multicast area.

In another possible implementation of this application, in a scenario in which the indication information includes the information about the second multicast session and the information about the fourth multicast session, a method in which "a first core network device obtains, based on the information about the multicast area, indication information" in the foregoing is as follows: The first core network device obtains, based on the information about the multicast area, information about the first area/information about the second area; after obtaining the information about the first area/the information about the second area, the first core network device sends a second message to a second core network device that belongs to the first network to request to establish the second multicast session, and sends a fifth message to a third core network device that belongs to the second network to request to establish the fourth multicast session; and subsequently the first core network device receives the information about the second multicast session from the second core network device, and the information about the fourth multicast session from the third core network device.

After obtaining the information about the first area/the information about the second area, the first core network device may trigger establishment of the second multicast session, to implement transmission of multicast service data in the first network, or may trigger establishment of the fourth multicast session, to implement transmission of multicast service data in the second network.

In another possible implementation of this application, the information about the first area/the information about the second area in this application is obtained by the first core network device according to the following process: The first core network device obtains, based on the information about the multicast area, the information about the first area/the information about the second area from local pre-configuration information; or the first core network device sends a sixth message that includes the information about the multicast area to a fourth core network device that belongs to the first network, to request to obtain the information about the first area/the information about the second area; and correspondingly the first core network device receives the information about the first area/the information about the second area from the fourth core network device.

The first core network device may obtain the information about the first area/the information about the second multicast session in a plurality of manners.

According to a second aspect, a communications apparatus is provided. The communications apparatus can implement the functions in any one of the first aspect and the possible implementations of the first aspect. These functions may be implemented by hardware, or may be implemented by hardware executing corresponding software. The hardware or software includes one or more modules corresponding to the functions.

In a possible implementation of this application, the communications apparatus may include a receiving unit, a processing unit, and a sending unit. The processing unit, the sending unit, and the receiving unit may perform corresponding functions in the communication method according to any one of the first aspect and the possible implementations of the first aspect. For example, the receiving unit is configured to receive information about a multicast area that is sent by a sender of a multicast service. The processing unit, is configured to obtain, based on the information about the multicast area received by the receiving unit, indication information, where the indication information is used to indicate that a first network cannot support the multicast service of the sender in the multicast area, or is used to indicate that a first network supports the multicast service of the sender in a portion of areas of the multicast area. The sending unit is configured to send the indication information obtained by the processing unit to the sender.

According to a third aspect, a communications apparatus is provided. The communications apparatus includes a processor, and the processor is configured to: be coupled to a memory, and read and execute instructions in the memory, to implement the communication method according to any one of the first aspect and the possible implementations of the first aspect.

Optionally, the communications apparatus further includes the memory, and the memory is configured to store program instructions and data of the communications apparatus. Further, optionally, the communications apparatus further includes a transceiver. The transceiver is configured to perform, under control of the processor of the communications apparatus, the step of receiving and sending data, signaling, or information in the communication method according to any one of the first aspect and the possible implementations of the first aspect, for example, receiving information about a multicast area, and sending indication information.

The communications apparatus may be a core network device, or may be a part of an apparatus in a core network device, for example, a chip system in the core network device. The chip system is configured to support the core network device in implementing functions in any one of the first aspect and the possible implementations of the first aspect, for example, receiving, sending, or processing data and/or information in the foregoing communication method. The chip system includes a chip, and may further include another discrete component or circuit structure.

According to a fourth aspect, a computer-readable storage medium is further provided. The computer-readable storage medium stores instructions. When the instructions are run on a communications apparatus, the communications apparatus is enabled to perform the communication method according to the first aspect and the possible implementations of the first aspect.

According to a fifth aspect, a computer program product including instructions is further provided. When the instructions are run on a communications apparatus, the communications apparatus is enabled to perform the communication method according to the first aspect and the possible implementations of the first aspect.

It should be noted that the instructions may be all or partially stored in a first computer storage medium. The first computer storage medium may be packaged together with a processor of the communications apparatus, or the first computer storage medium and a processor of the communications apparatus may be separately packaged. This is not specifically limited in this application.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the implementations of the first aspect. In addition, for beneficial effects of the second aspect, the third aspect, the fourth aspect, the fifth aspect, and the various implementations of the second aspect, the third aspect, the fourth aspect, and the fifth aspect, refer to analysis of the beneficial effects of the first aspect and the implementations of the first aspect. Details are not described herein again.

According to a sixth aspect, a communication method is provided. A sender of a multicast service sends information about a multicast area to a first core network device in a first network, and then the sender receives indication information from the first core network device. The indication information is used to indicate that the first network cannot support the multicast service of the sender in the multicast area, or is used to indicate that the first network supports the multicast service of the sender in a portion of areas of the multicast area.

In a possible implementation of this application, the information about the multicast area is carried in a first message, and the first message is used to request to establish a first multicast session in the multicast area.

In another possible implementation of this application, when the indication information is used to indicate that the first network cannot support the multicast service in the multicast area, the sender may further initiate establishment of a unicast session of the first network in the multicast area, or initiate establishment of a multicast session of a second network in the multicast area.

If the first network cannot support the multicast service in the multicast area, the sender no longer continues to request the first network to establish the first multicast session in the multicast area. The sender may request the first network to establish the unicast session in the multicast area, or may request the second network to establish the multicast session in the multicast area.

In another possible implementation of this application, the indication information in this application includes information about a first area or includes information about a second area. The first area herein is an area in which the first network supports the multicast service in the multicast area, and the second area is an area in which the first network does not support the multicast service in the multicast area. In this scenario, the indication information is used to indicate that the first network supports the multicast service in the portion of areas of the multicast area.

When the indication information includes the information about the first area or includes the information about the second area, the sender may further initiate establishment of a unicast session of the first network in the multicast area; or initiate establishment of a multicast session of a second network in the multicast area; or initiate establishment of a multicast session of the first network in the first area and establishment of a unicast session of the first network in the second area; or initiate establishment of a multicast session of the first network in the first area.

When the indication information indicates that the first network supports the multicast service in the portion of areas of the multicast area, the sender may communicate with another device in different manners based on the indication information, to complete transmission of multicast service data.

In another possible implementation of this application, the indication information in this application includes information about a first area and information about a third area. The first area is an area in which the first network supports the multicast service in the multicast area, and the third area is an area in which a second network supports the multicast service in the multicast area. In this scenario, the indication information is used to indicate that the first network supports the multicast service in the portion of areas of the multicast area.

When the indication information includes the information about the first area and the information about the third area, the sender initiates establishment of a multicast session of the first network in the first area; or initiates establishment of a multicast session of the second network in the third area; or initiates establishment of a unicast session of the first network in the multicast area; or initiates establishment of a unicast session of the second network in the multicast area.

That the indication information includes the information about the first area and the information about the third area indicates that neither a multicast system of the first network nor a multicast system of the second network is deployed across an entire network. In a scenario in which neither the multicast system of the first network nor the multicast system of the second network is deployed across the entire network, the communication method provided in this application can also implement the transmission of the multicast service data, and has relatively high practicability.

In another possible implementation of this application, the indication information in this application includes information about a third multicast session or includes information about a second multicast session and information about a fourth multicast session. Herein, the third multicast session is a multicast session established in the multicast area, and the third multicast session belongs to a second network. The second multicast session is a multicast session established in a first area, and the second multicast session belongs to the first network. The fourth multicast session is a multicast session established in a second area, and the fourth multicast session belongs to the second network. The first area is an area in which the first network supports the multicast service in the multicast area, and the second area is an area in which the first network does not support the multicast service in the multicast area. In this scenario, the indication information is used to indicate that the first network supports the multicast service in the portion of areas of the multicast area.

When the indication information includes the information about the third multicast session, or includes the information about the second multicast session and the information about the fourth multicast session, the sender may further initiate broadcast based on the indication information, thereby effectively reducing an operation of the sender, and improving communication efficiency.

In another possible implementation of this application, the indication information in this application includes information about a first area and information about a second multicast session, or includes information about a second area and information about a second multicast session. Herein, the first area is an area in which the first network supports the multicast service in the multicast area, the second area is an area in which the first network does not support the multicast service in the multicast area, the second multicast session is a multicast session established in the first area, and the second multicast session belongs to the first network. In this scenario, the indication information is used to indicate that the first network supports the multicast service in the portion of areas of the multicast area.

When the indication information includes the information about the first area and the information about the second multicast session, or includes the information about the second area and the information about the second multicast session, the sender further initiates broadcast based on the information about the second multicast session; and the sender initiates establishment of a unicast session of the first network in the second area/establishment of a multicast session of a second network in the second area, thereby effectively reducing an operation of the sender, and improving communication efficiency.

According to a seventh aspect, a communications apparatus is provided. The communications apparatus can implement functions in any one of the sixth aspect and the possible implementations of the sixth aspect. These functions may be implemented by hardware, or may be implemented by hardware executing corresponding software. The hardware or software includes one or more modules corresponding to the functions.

In a possible implementation of this application, the communications apparatus may include a sending unit, a receiving unit, and a processing unit. The sending unit, the receiving unit, and the processing unit may perform corresponding functions in the communication method according to any one of the sixth aspect and the possible implementations of the sixth aspect. For example, the sending unit is configured to send information about a multicast area to a first core network device in a first network. The receiving unit is configured to receive indication information from the first core network device. The processing unit is configured to initiate, based on the indication information received by the receiving unit, establishment of a multicast session/establishment of a unicast session/broadcast.

According to an eighth aspect, a communications apparatus is provided. The communications apparatus includes a processor, and the processor is configured to: be coupled to a memory, and read and execute instructions in the memory, to implement the communication method according to any one of the sixth aspect and the possible implementations of the sixth aspect.

Optionally, the communications apparatus further includes the memory, and the memory is configured to store program instructions and data of the communications apparatus. Further, optionally, the communications apparatus further includes a transceiver. The transceiver is configured to perform, under control of the processor of the communications apparatus, the step of receiving and sending data, signaling, or information in the communication method according to any one of the first aspect and the possible implementations of the first aspect, for example, sending information about a multicast area, and receiving indication information.

The communications apparatus may be a sender of a multicast service, or may be a part of an apparatus in a sender of a multicast service, for example, a chip system in the sender of the multicast service. The chip system is configured to support the sender of the multicast service in implementing functions in any one of the sixth aspect and the possible implementations of the sixth aspect, for example, receiving, sending, or processing data and/or information in the foregoing communication method. The chip system includes a chip, and may further include another discrete component or circuit structure.

According to a ninth aspect, a computer-readable storage medium is further provided. The computer-readable storage medium stores instructions. When the instructions are run on a communications apparatus, the communications apparatus is enabled to perform the communication method according to the sixth aspect and the possible implementations of the sixth aspect.

According to a tenth aspect, a computer program product including instructions is further provided. When the instructions are run on a communications apparatus, the communications apparatus is enabled to perform the communication method according to the sixth aspect and the possible implementations of the sixth aspect.

It should be noted that the instructions may be all or partially stored in a second computer storage medium. The second computer storage medium may be packaged together with a sender of a multicast service, or the second computer storage medium and a sender of a multicast service may be separately packaged. This is not specifically limited in this application.

In this application, for detailed descriptions of the seventh aspect, the eighth aspect, the ninth aspect, the tenth aspect, and various implementations of the seventh aspect, the eighth aspect, the ninth aspect, and the tenth aspect, refer to detailed descriptions of the sixth aspect and the implementations of the sixth aspect. In addition, for beneficial effects of the seventh aspect, the eighth aspect, the ninth aspect, the tenth aspect, and the various implementations of the seventh aspect, the eighth aspect, the ninth aspect, and the tenth aspect, refer to analyses of the beneficial effects of the sixth aspect and the implementations of the sixth aspect. Details are not described herein again.

According to an eleventh aspect, a communications system is provided, including the communications apparatus according to any one of the second aspect to the fifth aspect and the communications apparatus according to any one of the seventh aspect to the tenth aspect.

In this application, a name of the communications apparatus does not constitute any limitation to devices or functional modules. During actual implementation, these devices or the functional modules may have other names. All devices or functional modules with functions similar to those in this application fall within the scope defined by the claims of this application and equivalent technologies of this application.

These aspects or other aspects of this application are clearer and easier to understand in the following descriptions.

DETAILED DESCRIPTION OF ILLUSTRATIVE EMBODIMENTS

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the term such as "example" or "for example" is intended to present a relative concept in a specific manner.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

In the embodiments of this application, an evolved NodeB (eNB) in a 4th generation communication technology (4G) network is referred to as a 4G eNB, user equipment (UE) in the 4G network is referred to as 4G UE, and UE in a 5G network is referred to as 5G UE.

Figure 1:
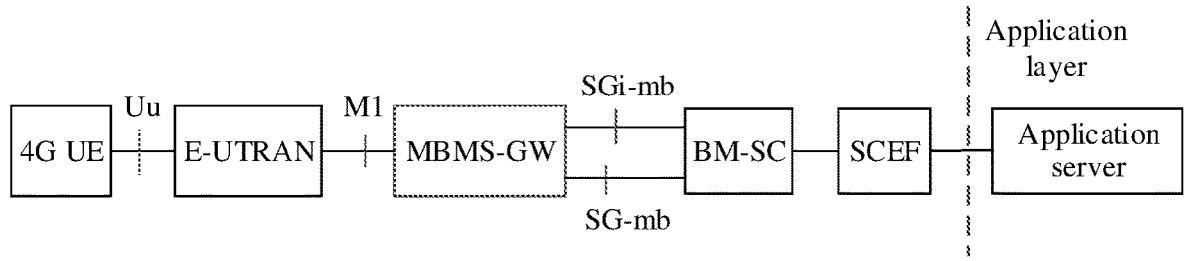
FIG. 1 is a schematic structural diagram of an MBMS system in a 4G network.

In the 3rd generation partnership project (3GPP) standard, an architecture of an MBMS system in the 4G network is defined. FIG. 1 shows a structure of the MBMS system.

As shown in FIG. 1, the MBMS system in the 4G network includes 4G UE, an evolved UMTS terrestrial radio access network (E-UTRAN) device, a multimedia broadcast multicast gateway (MBMS-GW) entity, a broadcast multicast service center (BMSC) entity, a service capability exposure function (SCEF) entity, and an application server (which may also be represented by using an application function (AF) device). The BMSC entity, the MBMS-GW entity, and the SCEF entity are all core network devices. Uu, M1, SGi-mb, and SG-mb in FIG. 1 all represent interfaces. For a definition of each of the foregoing interfaces, refer to descriptions in the 3GPP standard. Details are not described herein again.

The 4G UE is configured to receive multicast service data. Before receiving the multicast service data, the 4G UE receives configuration information from the application server, for example, a frequency on which the multicast service data is sent and a time point at which the multicast service data is received. In this way, the 4G UE receives the multicast service data based on the configuration information.

The E-UTRAN device is an access network device of the MBMS system, and may be a 4G eNB that provides, for the 4G UE, an interface for accessing a wireless network.

The BMSC entity is a service layer entity in the MBMS system, has function session management and a service management function, and is, for example, configured to: provide convergence and sending of a multicast service, user authorization, establishment and initiation of a multicast service bearer, and determining of a transmission mode (for example, unicast transmission or multicast transmission). In addition, the BMSC may further implement synchronization between the BMSC and the 4G eNB.

The MBMS-GW is an access gateway of the MBMS system, and is configured to: process a user-data-related packet and session-related signaling, send the multicast service data to the E-UTRAN device in a multicast manner, allocate a multicast address, and the like.

The SCEF entity is configured to securely provide a service and a capability of the 3GPP network through a 3GPP network interface. For example, the SCEF may provide a multicast session establishment/modification/deletion service for the application server. The application server may implement session-related management by invoking a related service of an SCEF interface.

The application server is a sender of the multicast service and connects to the 4G UE through a GC1 interface at an application layer.

In actual application, the application server may obtain location information of the 4G UE through the GC1 interface, and may further obtain a type of a network accessed by the 4G UE and/or capability information of the 4G UE, to implement the session management function of the BMSC, for example, the determining of the transmission mode. In this case, the application server may transmit data in a unicast manner, or may transmit data in a multicast manner.

Figure 2:
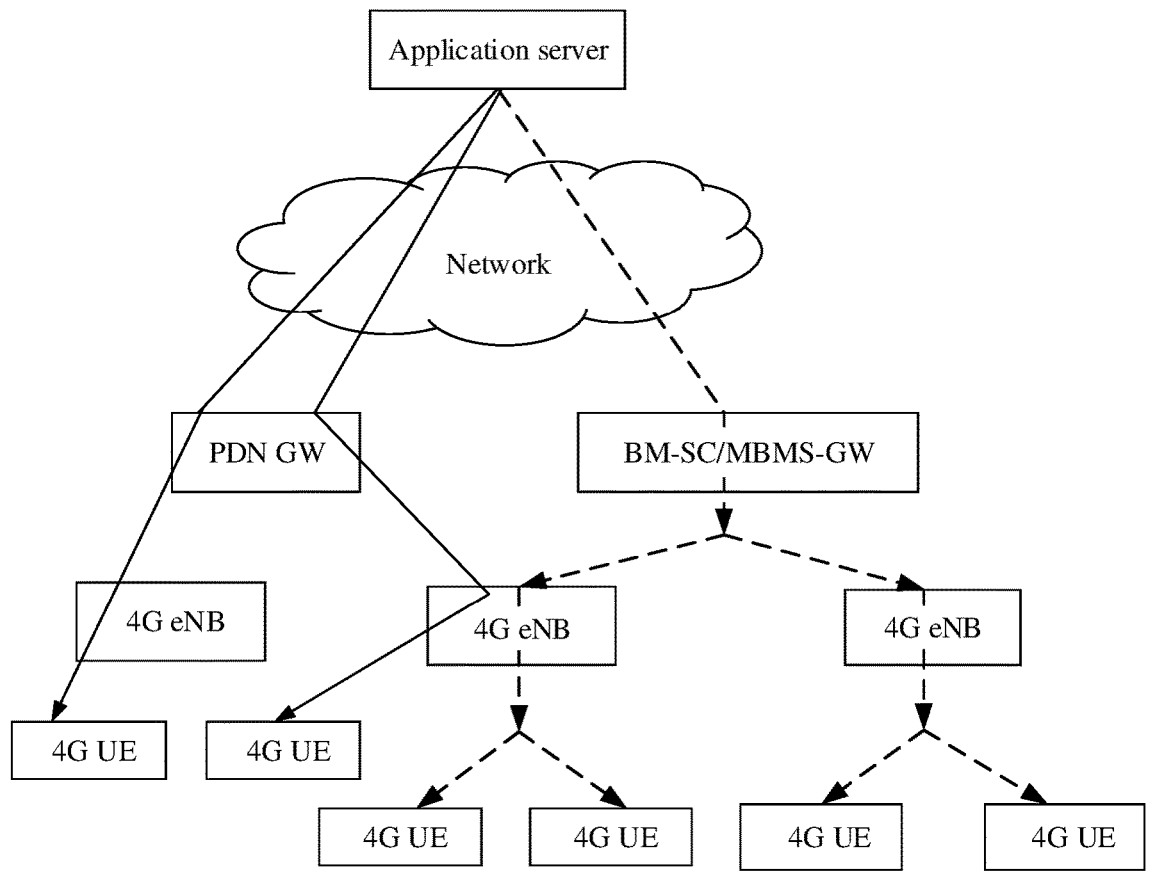
FIG. 2 is a schematic diagram in which an application server transmits data in different manners.

FIG. 2 shows that an application server transmits data in different manners. A packet data network gateway (PDN GW) in FIG. 2 is a core network device that transmits unicast service data. A solid line indicates that the application server transmits data in a unicast transmission manner, and a dashed line indicates that the application server transmits data in a multicast manner.

With development of communications technologies, a 4G network gradually evolves to a 5G network. To promote development of a multicast technology, in the 5G network, a session management function and a service management function in an MBMS system are separated from each other, a multicast/broadcast-service control entity is used to implement the service management function, and an enhanced multicast/broadcast-session management (MB-SMF) entity is used to implement the session management function. In addition, an enhanced multicast/broadcast-user plane function (MB-UPF) entity is used in the 5G network to implement transmission of multicast service data.

Figure 3:
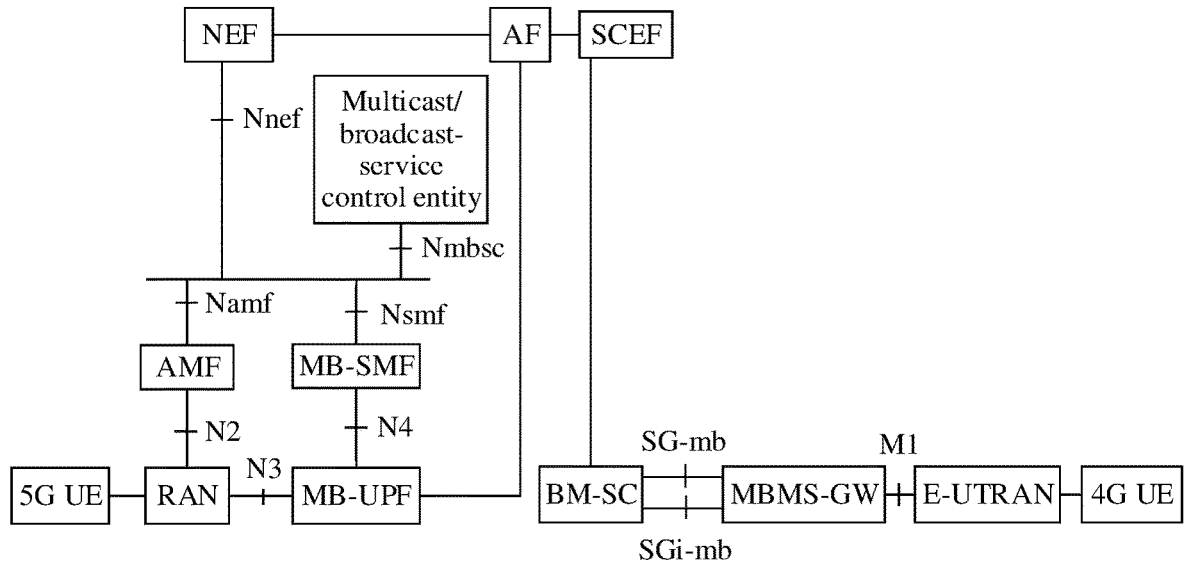
FIG. 3 is a schematic structural diagram of a communications system configured to support a multicast service in a scenario in which a 4G network and a 5G network coexist.

With reference to FIG. 1, FIG. 3 shows a structure of a communications system configured to support a multicast service in a scenario in which the 4G network and the 5G network coexist. A function of an AF entity shown in FIG. 3 is the same as that of the application server in FIG. 2, and the AF entity may be simply considered as an application server. In addition to the device shown in FIG. 1, FIG. 3 further includes a network exposure function (NEF) entity, an access management function (AMF) entity, a RAN device, and 5G UE. A multicast/broadcast-service control entity, an MB-SMF entity, an MB-UPF entity, the AMF entity, and the NEF entity are all core network devices in the 5G network. Nnef, Namf, Nmbsc, Nsmf, N2, N3 and N4 in FIG. 3 also all represent interfaces, and a definition of each of the interfaces is not described in detail herein.

The NEF entity is configured to: provide data in the 5G network for a third-party application server, or receive data provided by a third-party application server for the 5G network. The AMF entity is a control plane entity in the 5G network, and is configured to: terminate non-access signaling, and implement mobility management and lawful interception, access authorization/authentication, and the like. The RAN device is an access network device in the 5G network, and may be a base station that provides, for the 5G UE, an interface for accessing a wireless network.

It may be understood that the communications system shown in FIG. 3 is merely an example, and is not intended to limit the communications system. In actual application, the communications system may further include another device, for example, a network repository function (NRF) entity.

The NRF entity is configured to provide a discovery service of a network functional entity. For example, after receiving a network element entity discovery request sent by a network entity, the NRF entity provides related information of the request, and is further configured to maintain description information and provided service information of some network entities (for example, an AMF entity and an SMF entity) in the network.

All multicast in the embodiments of this application may be replaced with broadcast.

In actual application, an operator cannot quickly deploy a multicast system of the 5G network across an entire network, and the application server cannot determine an area in which the multicast system of the 5G network has been deployed.

For the foregoing problem, the embodiments of this application provide a communications method, apparatus, and system. After receiving information about a multicast area that is sent by a sender of a multicast service, a first core network device in a first network obtains, based on the information about the multicast area, indication information that is used to indicate that the first network cannot support the multicast service in the multicast area, or is used to indicate that the first network supports the multicast service in a portion of areas of the multicast area; and sends the indication information to the sender. In this way, the sender can determine whether the first network supports the multicast service of the sender in the multicast area.

Figure 4:
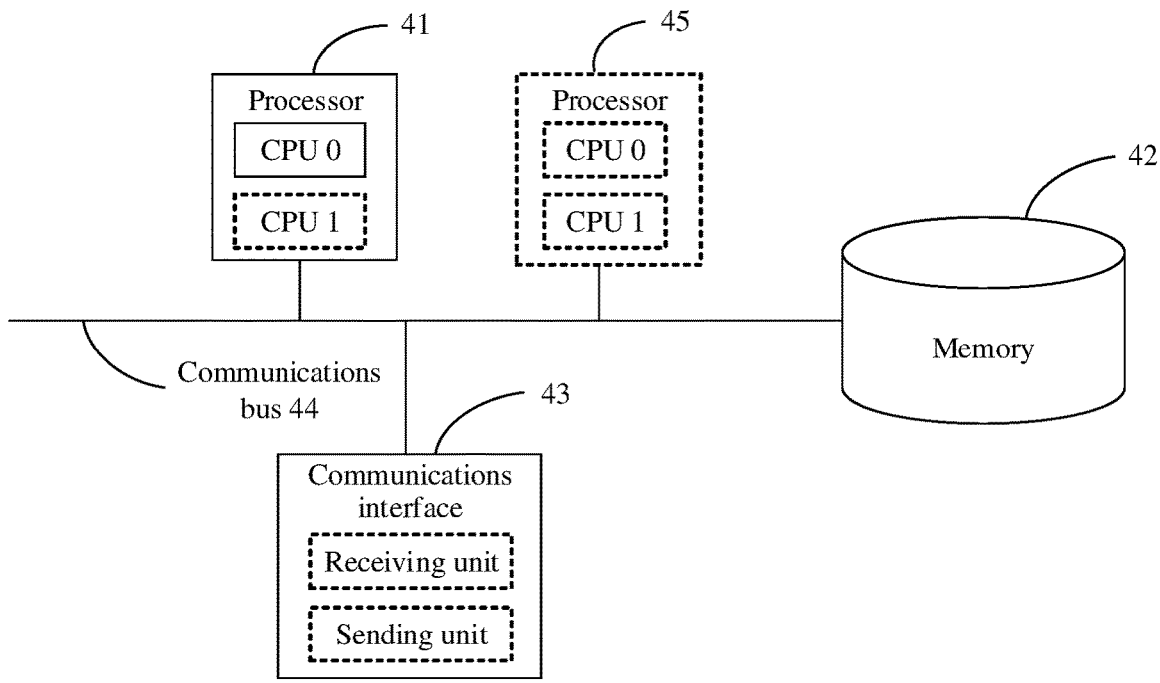
FIG. 4 is a schematic structural diagram of a communications apparatus according to an embodiment of this application.

The communication method provided in the embodiments of this application is applicable to the communications system shown in FIG. 3. Each device in FIG. 3 is a communications apparatus. During specific implementation, the communications apparatus has components shown in FIG. 4. FIG. 4 is a schematic composition diagram of a communications apparatus according to an embodiment of this application. As shown in FIG. 4, the communications apparatus may include at least one processor 41, a memory 42, a communications interface 43, and a communications bus 44. The following describes each component of the communications apparatus in detail with reference to FIG. 4.

The processor 41 is a control center of the communications apparatus, and may be one processor or may be a collective name of a plurality of processing elements. For example, the processor 41 may be a central processing unit (CPU), or an application-specific integrated circuit (ASIC), or one or more integrated circuits configured to implement this embodiment of this application, for example, one or more digital signal processors (DSP), or one or more field programmable gate arrays (FPGA).

The processor 41 may run or execute a software program stored in the memory 42, and invoke data stored in the memory 42, to perform various functions of the communications apparatus.

During specific implementation, in an embodiment, the processor 41 may include one or more CPUs, for example, a CPU 0 and a CPU 1 shown in FIG. 4.

During specific implementation, in an embodiment, the communications apparatus may include a plurality of processors, for example, the processor 41 and a processor 45 shown in FIG. 4. Each of the processors may be a single-core processor (single-CPU) or may be a multi-core processor (multi-CPU). The processor herein may be one or more devices, circuits, and/or processing cores configured to process data (for example, computer program instructions).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that is accessible by a computer. However, the memory 42 is not limited thereto. The memory 42 may exist independently, and is connected to the processor 41 by using a communications bus 44. The memory 42 may alternatively be integrated with the processor 41.

The memory 42 is configured to store a software program for performing the solutions of this application, and the processor 41 controls execution of the software program.

The communications interface 43 is configured to communicate with another device or a communications network such as the Ethernet, a radio access network (RAN), or a wireless local area network (WLAN) by using any apparatus such as a transceiver. The communications interface 43 may include a receiving unit for implementing a receiving function and a sending unit for implementing a sending function.

The communications bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that a device structure shown in FIG. 4 does not constitute a limitation on the communications apparatus. In addition to the components shown in FIG. 4, the communications apparatus may include more or fewer components than those shown in the figure, or combine some components, or have different component arrangements.

With reference to the communications system shown in FIG. 3 and the communications apparatus shown in FIG. 4, the following describes communication methods according to embodiments of this application. Each device in the following method embodiments may have components shown in FIG. 4, and details are not described again.

For ease of understanding, an example in which a first network is a 5G network and a second network is a 4G network is used for description in the embodiments of this application.

Figure 5:
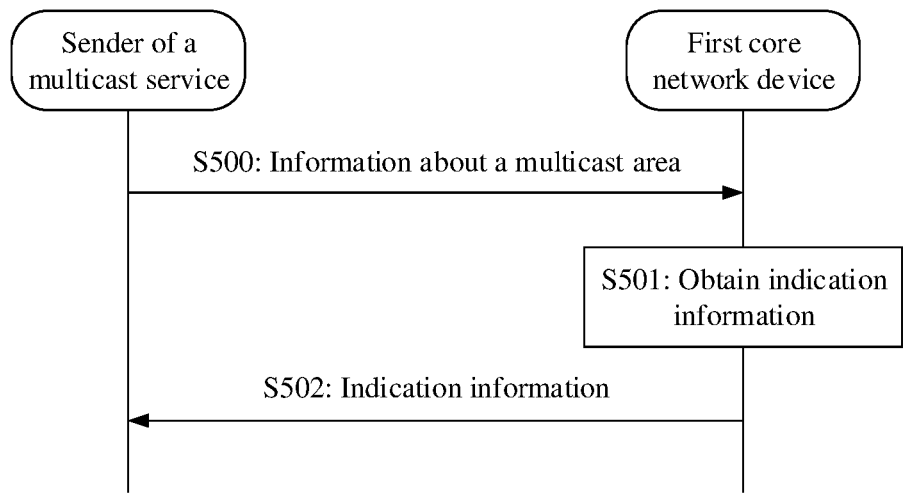
FIG. 5 is a first schematic flowchart of a communication method according to an embodiment of this application.

FIG. 5 is a flowchart of the communication method according to an embodiment of this application. As shown in FIG. 5, the communication method may include the following steps.

S500: A sender of a multicast service (the sender for short below) sends information about a multicast area to a first core network device.

The first core network device belongs to the 5G network. In other words, the first core network device is a core network device in the 5G network. With reference to FIG. 3, the sender is the AF entity, and the first core network device may be the NEF entity.

Specifically, the sender obtains an address of the first core network device, and sends, based on the address of the first core network device, the information about the multicast area to the first core network device.

Optionally, a manner in which the sender obtains the address of the first core network device is as follows: The sender obtains the address of the first core network device based on local configuration information. Alternatively, the sender of the multicast service queries a common application protocol interface function core (CAPIF core) network element, to obtain the address of the first core network device.

The CAPIF core network element is configured to: authenticate an invoker (for example, an application server) of an application programming interface (API), discover information about the API interface (for example, discover an address of the NEF network element), provide API access information (including policy information, and authentication, authorization, and verification information), and the like.

In this embodiment of this application, the information about the multicast area may be geographical area information, a cell identifier (cell ID), a service area identifier (SAI), or other information that can indicate the area. This is not specifically limited in this embodiment of this application.

The information about the multicast area may be carried in a first message. In this way, that a sender sends information about a multicast area to a first core network device is essentially that the sender sends the first message that carries the information about the multicast area to the first core network device.

The first message may be used to request to establish a first multicast session in the multicast area, or may be used to request to allocate group identification information (for example, a temporary mobile group identity (TMGI)) in the multicast area. For ease of description, an example in which the first message is used to request to establish the first multicast session in the multicast area is mainly used for description in this embodiment of this application.

It is easily understood that, because the first message is a message sent by the sender to the first core network device, and the first core network device belongs to the 5G network, the first multicast session belongs to the 5G network. In other words, the first multicast session is a multicast session in the 5G network.

Optionally, when the first message is used to request to establish the first multicast session in the multicast area, the first message may further include quality of service (Qos) information.

S501: The first core network device obtains, based on the information about the multicast area, indication information.

The indication information is used to indicate that the 5G network cannot support the multicast service in the multicast area, or is used to indicate that the 5G network supports the multicast service in a portion of areas of the multicast area.

The indication information in this embodiment of this application may be represented in a plurality of manners, for example, the following manners a to d.

Manner a: The indication information is a first identifier, a first information element, or a specific message name.

Manner b: The indication information includes information about a first area.

The first area is an area in which the 5G network supports the multicast service in the multicast area. The term "support" in this embodiment of this application may alternatively be replaced with "allow".

Manner c: The indication information includes information about a second area.

The second area is an area in which the 5G network does not support the multicast service in the multicast area.

Manner d: The indication information includes the information about the first area and information about a third area.

The third area is an area in which the 4G network supports the multicast service in the multicast area. For a definition of the first area, refer to the descriptions of the foregoing manner b.

The information about the first area, the information about the second area, and the information about the third area all may be geographical area information, cell identities (cell ID), SAIs, or other information that can indicate the areas. This is not specifically limited in this embodiment of this application.

It can be learned that, if the manner a is used to represent the indication information, the indication information is used to indicate that the 5G network cannot support the multicast service in the multicast area; or if any one of the manner b to manner d is used to represent the indication information, the indication information is used to indicate that the 5G network supports the multicast service in the portion of areas of the multicast area.

Specifically, for the indication information represented in any one of the foregoing manner a to manner c, the first core network device may obtain the indication information by using any one of the following methods.

Method 1: The first core network device searches local pre-configuration information for the information about the multicast area, and determines the indication information.

Method 2: The first core network device sends a sixth message (including the information about the multicast area) to a fourth core network device (for example, an NRF entity) that belongs to the 5G network, to request to obtain the information about the first area/the information about the second area. Correspondingly, the first core network device receives the area information (for example, the information about the first area/the information about the second area) from the fourth core network device. In this way, the first core network device can obtain the indication information.

That the fourth core network device belongs to the 5G network means that the fourth core network device is a core network device in the 5G network.

For example, the sixth message may be an Nnrf_NFDiscovery_Request Request message.

It should be noted that "the area information from the fourth core network device" in the foregoing may be null. In this case, in this embodiment of this application, it is considered that the multicast service is not supported in any area of the multicast area. In other words, if the area information received by the first core network device from the fourth core network device is null, the first core network device obtains the indication information that is used to indicate that the 5G network cannot support the multicast service in the multicast area.

For the indication information represented in the foregoing manner d, the first core network device obtains the information about the first area by using the foregoing method 1 or method 2. After obtaining the information about the first area, the first core network device sends a third message to a third core network device (for example, an SCEF entity) that belongs to the 4G network, to request to obtain the information about the third area. Correspondingly, the first core network device receives the information about the third area from the third core network device. In this way, the first core network device can obtain the information about the first area and the information about the third area. A specific procedure of this scenario is described in the following FIG. 11.

That the third core network device belongs to the 4G network means that the third core network device is a core network device in the 4G network.

In addition, in addition to the foregoing manner a to manner d, the indication information in this embodiment of this application may alternatively be represented in another manner, for example, the following manner e to manner g.

Manner e: The indication information includes information about a first area (or information about a second area) and information about a second multicast session.

The second multicast session is a multicast session established in the first area, and the second multicast session belongs to the 5G network (in other words, the second multicast session is a multicast session in the 5G network).

Manner f: The indication information includes information about a third multicast session.

The third multicast session is a multicast session established in the multicast area, and the third multicast session belongs to the 4G network (in other words, the third multicast session is a multicast session in the 4G network).

Manner g: The indication information includes information about a second multicast session and information about a fourth multicast session.

The fourth multicast session is a multicast session established in a second area, and the fourth multicast session belongs to the second network (in other words, the fourth multicast session is a multicast session in the 4G network). For a definition of the second multicast session, refer to the descriptions of the foregoing manner e. Details are not described herein again.

It can be learned that, if any one of the manner e to manner g is used to represent the indication information, the indication information is used to indicate that the 5G network supports the multicast service in the portion of areas of the multicast area.

For the indication information represented in the foregoing manner e, the first core network device obtains the information about the first area (or the information about the second area) by using the foregoing method 1 or method 2. After obtaining the information about the first area (or the information about the second area), the first core network device sends a second message to a second core network device (for example, an MB-SMF entity) that belongs to the 5G network, to request to establish the second multicast session in the first area. Correspondingly, the first core network device receives the information about the second multicast session from the second core network device. In this way, the first core network device can obtain the indication information represented in the manner e.

That the second core network device belongs to the 5G network means that the second core network device is a core network device in the 5G network.

Optionally, the information about the first area (or the information about the second area) and the information about the second multicast session may be carried in different messages (a specific procedure of this scenario is described in the following FIG. 7), or may be carried in a same message (a specific procedure of this scenario is described in the following FIG. 8).

For the indication information represented in the foregoing manner f, a method for obtaining the indication information by the first core network device is as follows: The first core network device obtains information about a first area (or information about a second area) by using the foregoing method 1 or method 2. After obtaining the information about the first area (or the information about the second area), the first core network device sends a fourth message to a third core network device (for example, an SCEF entity) that belongs to the 4G network, to request to establish the third multicast session in the multicast area. Correspondingly, the first core network device receives the information about the third multicast session from the third core network device. A specific procedure of this scenario is described in the following FIG. 9.

For the indication information represented in the foregoing manner g, a method for obtaining the indication information by the first core network device is as follows: The first core network device obtains information about a first area (or information about a second area) by using the foregoing method 1 or method 2. After obtaining the information about the first area (or the information about the second area), the first core network device sends a second message to a second core network device (for example, a G-SMF entity) that belongs to the 5G network, to request to establish the second multicast session in the first area; and sends a fifth message to a third core network device (for example, an SCEF entity) that belongs to the 4G network, to request to establish the fourth multicast session in the first area. Correspondingly, the first core network device receives the information about the second multicast session from the second core network device, and the information about the fourth multicast session from the third core network device. A specific procedure of this scenario is described in the following FIG. 10.

Certainly, the indication information in this embodiment of this application may alternatively be represented in another manner other than the foregoing manner a to manner g. Examples are not described one by one in this embodiment of this application.

S502: The first core network device sends the indication information to the sender.

After obtaining the indication information, the first core network device sends the indication information to the sender. The indication information is carried in a response message of the first message.

For example, the response message of the first message may be a multicast session establishment failure message.

It is easily understood that after receiving the indication information from the first core network device, the sender learns, based on the indication information, that the 5G network cannot support the multicast service in the multicast area or that the 5G network supports the multicast service in the portion of areas of the multicast area. In this way, the sender may communicate with another device based on an actual requirement, to complete transmission of multicast service data.

Further, if the indication information received by the sender is represented in the foregoing manner a, the sender may further initiate establishment of a unicast session of the 5G network in the multicast area, or initiate establishment of a multicast session of the 4G network in the multicast area.

If the indication information received by the sender is represented in the foregoing manner b or manner c, the sender may further initiate establishment of a unicast session of the 5G network in the multicast area; or initiate establishment of a multicast session of the 4G network in the multicast area; or initiate establishment of a multicast session of the 5G network in the first area and establishment of a unicast session of the 5G network in the second area; or initiate establishment of a multicast session of the 5G network in the first area.

If the indication information received by the sender is represented in the foregoing manner d, the sender may further initiate establishment of a unicast session of the 5G network in the multicast area; or initiate establishment of a multicast session of the 4G network in the multicast area; or initiate establishment of a multicast session of the 5G network in the first area; or initiate establishment of a multicast session of the 4G network in the third area.

If the indication information received by the sender is represented in the foregoing manner e, the sender may further initiate broadcast based on the information about the second multicast session; or initiate establishment of a unicast session of the 5G network in the second area; or initiate establishment of a multicast session of the 4G network in the second area.

If the indication information received by the sender is represented in either of the foregoing manner f and manner g, the sender initiates broadcast based on the indication information.

It can be learned that after receiving the indication information, the sender may complete, based on specific content of the indication information and with reference to a pre-configuration or an actual requirement, corresponding processing, to implement the transmission of the multicast service data.

To more clearly understand the communication method provided in this embodiment of this application, the following describes the communication method shown in FIG. 5 in detail with reference to FIG. 6 to FIG. 11.

In FIG. 6 to FIG. 11, a NEF entity is used to represent a first core network device, an MB-SMF entity is used to represent a second core network device, an SCEF entity is used to represent a third core network device, and an NRF entity is used to represent a fourth core network device.

Figure 6:
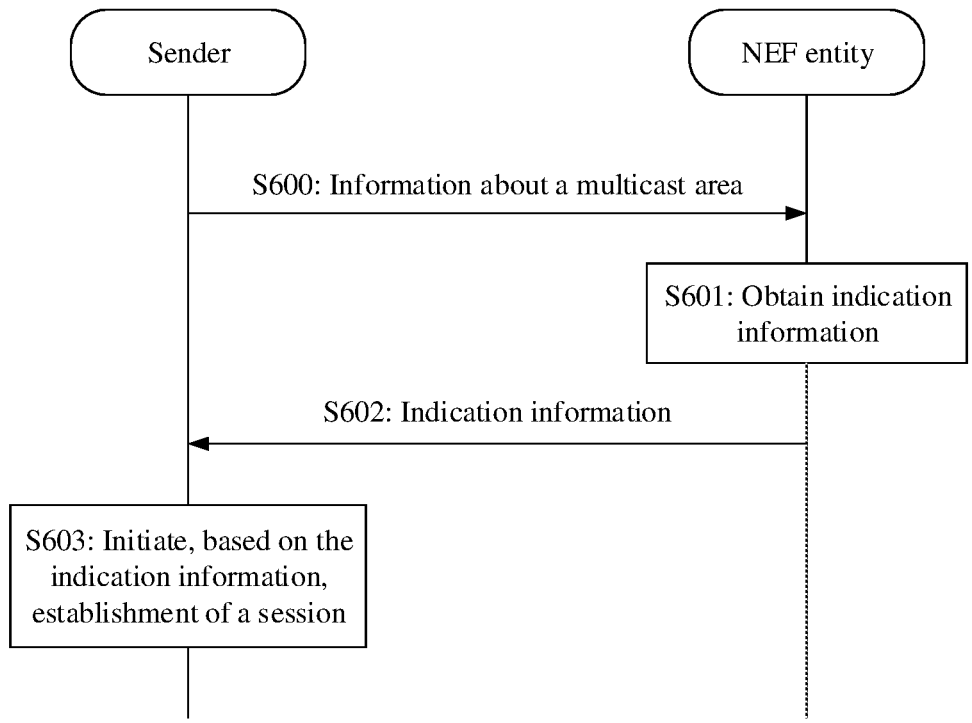
FIG. 6 is a second schematic flowchart of a communication method according to an embodiment of this application.

FIG. 6 is a flowchart of a communication method according to an embodiment of this application. In a procedure shown in FIG. 6, indication information is represented in any one of the manner a to manner c.

As shown in FIG. 6, the communication method may include the following steps.

S600: A sender sends information about a multicast area to a NEF entity.

For S600, refer to the foregoing descriptions of S500. Details are not described herein again.

S601: The NEF entity obtains, based on the information about the multicast area, information about a first area (or information about a second area).

The NEF entity obtains the information about the first area (or the information about the second area) by using the method 1 or the method 2 described in S501. Details are not described herein again.

S602: The NEF entity sends the indication information to the sender.

If the information that is about the first area and that is obtained by the NEF entity is null, it indicates that a 5G network cannot support a multicast service in the multicast area, and the indication information sent by the NEF entity is represented in the foregoing manner a.

If the information that is about the first area (or the information that is about the second area) and that is obtained by the NEF entity is not null, it indicates that a 5G network supports a multicast service in a portion of areas of the multicast area, and the indication information sent by the NEF entity is represented in the foregoing manner b or manner c.

S603: The sender initiates, based on the indication information, establishment of a session.

If the indication information received by the sender is represented in the foregoing manner a, the sender may initiate establishment of a unicast session of the 5G network in the multicast area, or initiate establishment of a multicast session of a 4G network in the multicast area.

In addition, if the indication information received by the sender is represented in the foregoing manner b or manner c, the sender may initiate establishment of a unicast session of the 5G network in the multicast area; or initiate establishment of a multicast session of a 4G network in the multicast area; or initiate establishment of a multicast session of the 5G network in the first area and establishment of a unicast session of the 5G network in the second area; or may further initiate establishment of a multicast session of the 5G network in the first area.

For a method of initiating establishment of the unicast session of the 5G network in the multicast area by the sender, refer to a method for establishing a unicast session of the 5G network in a multicast area in a current technology. Details are not described herein again. Likewise, for a method of initiating establishment of the multicast session of the 4G network in the multicast area by the sender, a method of initiating establishment of the multicast session of the 5G network in the first area and establishment of the unicast session of the 5G network in the second area by the sender, and a method of initiating establishment of the multicast session of the 5G network in the first area by the sender, refer to descriptions in a current technology. Details are not described herein again.

After a corresponding session (the unicast session/the multicast session) is established, the sender triggers transmission of multicast service data.

According to the communication method shown in FIG. 6, after receiving the indication information from the NEF entity, the sender learns, based on the indication information, that the 5G network cannot support the multicast service in the multicast area or that the 5G network supports the multicast service in the portion of areas of the multicast area. In addition, the sender may communicate, based on the indication information, with another device in different manners, to complete the transmission of the multicast service data.

Subsequently, with reference to FIG. 7 to FIG. 11, a case in which the information about the first area/the information about the second area that is obtained by the NEF entity is not null is described.

After obtaining the information about the first area (or the information about the second area), the NEF entity may further trigger a process in which the 5G network establishes a second multicast session in the first area, and send information about the second multicast session to the sender. In this way, the indication information includes the information about the first area (or the information about the second area) and the information about the second multicast session, that is, the indication information is represented in the foregoing manner e.

When the indication information is represented in the foregoing manner e, the information about the first area (or the information about the second area) and the information about the second multicast session may be carried in different messages, or may be carried in a same message. FIG. 7 shows a method procedure in which the information about the first area (or the information about the second area) and the information about the second multicast session are carried in the different messages. FIG. 8 shows a method procedure in which the information about the first area (or the information about the second area) and the information about the second multicast session are carried in the same message.

Figure 7:
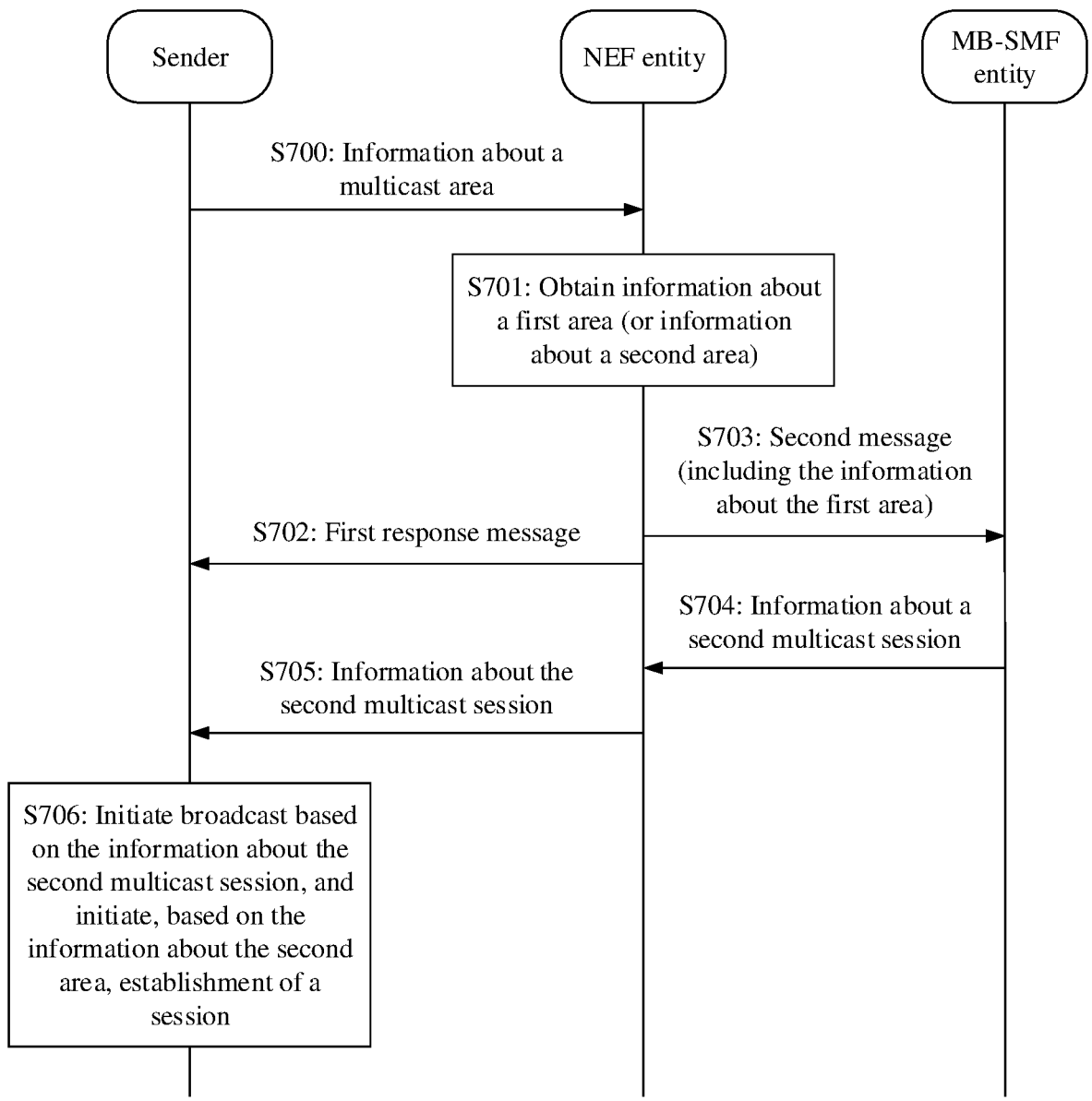
FIG. 7 is a third schematic flowchart of a communication method according to an embodiment of this application.

FIG. 7 is a flowchart of another communication method according to an embodiment of this application. As shown in FIG. 7, the communication method includes the following steps.

S700: A sender sends information about a multicast area to a NEF entity.

For S700, refer to the foregoing descriptions of S500. Details are not described herein again.

S701: The NEF entity obtains, based on the information about the multicast area, information about a first area (or information about a second area).

The NEF entity obtains the information about the first area (or the information about the second area) by using the method 1 or the method 2 described in S501. Details are not described herein again.

S702: The NEF entity sends a first response message of a first message to the sender.

The first response message may include the information about the first area, or include the information about the second area, or include an identifier/an information element/a specific message name used to indicate that a 5G network supports a multicast service in a portion of areas of the multicast area.

For example, the first response message is a multicast session establishment failure message.

S703: The NEF entity sends, to an MB-SMF entity, a second message including the information about the first area, to request to establish a second multicast session in the first area.

The NEF entity may first perform S702, and then perform S703, or may first perform S703, and then perform S702, or may simultaneously perform S702 and S703. This is not specifically limited in this embodiment of this application.

S704: The MB-SMF entity sends information about the second multicast session to the NEF entity.

After receiving the second message, the MB-SMF entity communicates with another device, to establish the second multicast session. After the second multicast session is successfully established, the MB-SMF entity obtains the information about the second multicast session, and sends the information about the second multicast session to the NEF entity.

The information about the second multicast session may include a user plane parameter (such as a port number or an IP address) of the second multicast session, a TMGI, and the like.

S705: The NEF entity sends the information about the second multicast session to the sender.

The information about the second multicast session is carried in a second response message of the first message.

For example, the second response message is a multicast session establishment response message.

S706: The sender initiates broadcast based on the information about the second multicast session, and initiates, based on the information about the second area, establishment of a session.

After receiving the first response message, the sender may initiate, based on the information about the second area, establishment of the session. Alternatively, after receiving the first response message and the information about the second multicast session, the sender may initiate, based on the information about the second area, establishment of the session. This is not specifically limited in this embodiment of this application.

That the sender initiates, based on the information about the second area, establishment of the session means that the sender initiates establishment of a unicast session of the 5G network in the second area; or initiates establishment of a multicast session of a 4G network in the second area.

For a method of initiating establishment of the unicast session of the 5G network in the second area by the sender, and a method of initiating establishment of the multicast session of the 4G network in the second area by the sender, refer to descriptions in a current technology. Details are not described herein again.

Compared with the communication method shown in FIG. 6, in the communication method shown in FIG. 7, the sender may initiate establishment of the session in the second area more quickly, thereby improving communication efficiency.

Figure 8:
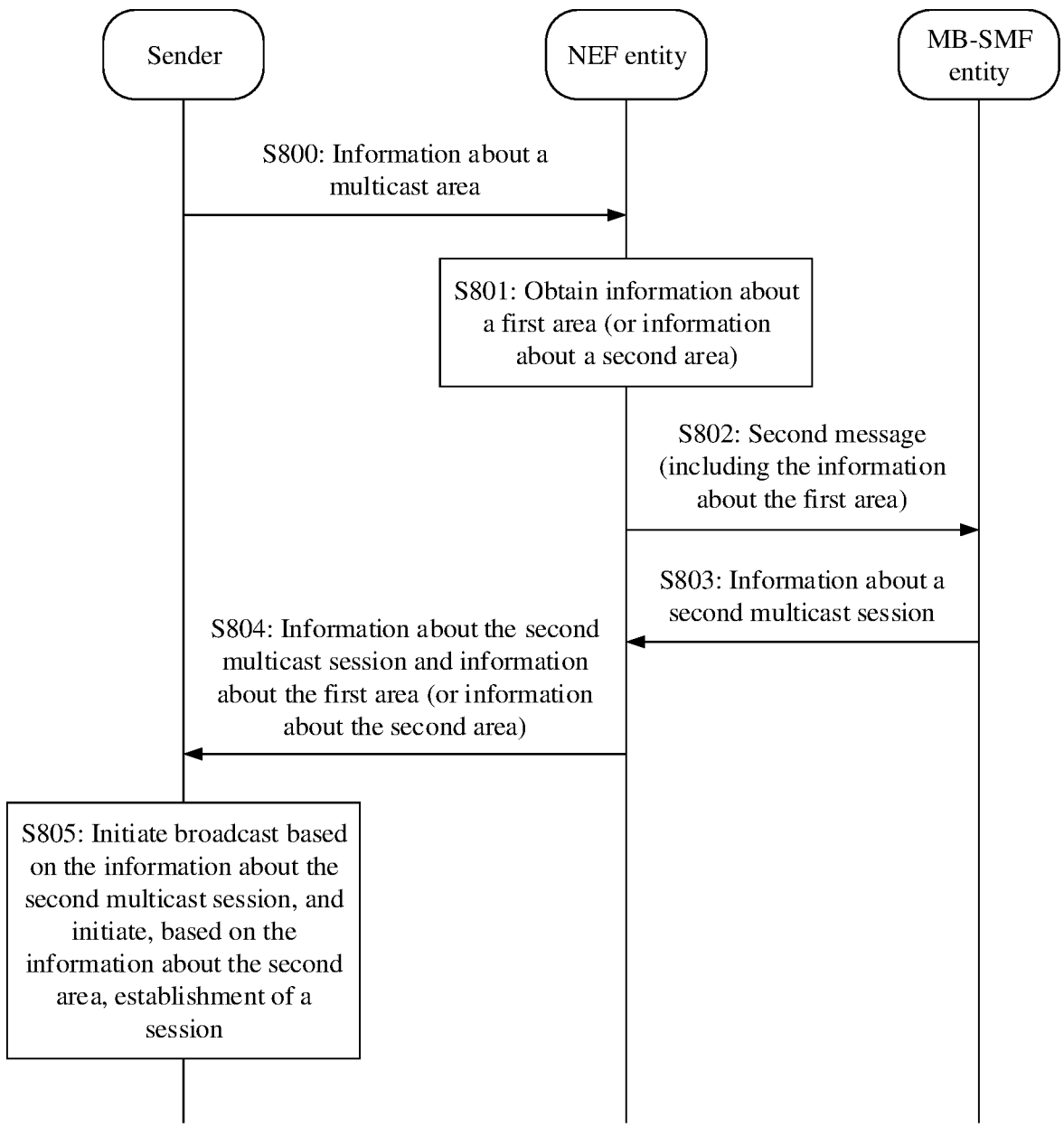
FIG. 8 is a fourth schematic flowchart of a communication method according to an embodiment of this application.

FIG. 8 is a flowchart of another communication method according to an embodiment of this application. As shown in FIG. 8, the communication method includes the following steps.

S800: A sender sends information about a multicast area to a NEF entity.

For S800, refer to the foregoing descriptions of S500. Details are not described herein again.

S801: The NEF entity obtains, based on the information about the multicast area, information about a first area (or information about a second area).

The NEF entity obtains the information about the first area (or the information about the second area) by using the method 1 or the method 2 described in S501. Details are not described herein again.

S802: The NEF entity sends, to an MB-SMF entity, a second message including the information about the first area, to request to establish a second multicast session in the first area.

S803: The MB-SMF entity sends information about the second multicast session to the NEF entity.

After receiving the second message, the MB-SMF entity communicates with another device, to establish the second multicast session. After the second multicast session is successfully established, the MB-SMF entity obtains the information about the second multicast session, and sends the information about the second multicast session to the NEF entity.

The information about the second multicast session may include a user plane parameter (such as a port number or an IP address) of the second multicast session, a TMGI, and the like.

S804: The NEF entity sends the information about the first area (or the information about the second area) and the information about the second multicast session to the sender.

The information about the first area (or the information about the second area) and the information about the second multicast session are carried in a response message of a first message.

For example, the response message of the first message is a multicast session establishment response message.

S805: The sender initiates broadcast based on the information about the second multicast session, and initiates, based on the information about the second area, establishment of a session.

For S805, refer to S706. Details are not described herein again.

Compared with the communication method shown in FIG. 7, in the communication method shown in FIG. 8, the information about the first area (or the information about the second area) and the information about the second multicast session are carried in the same message, so that message transmission is effectively reduced, reducing resource usage.

After obtaining the information about the first area (or the information about the second area), the NEF entity may further trigger a process in which a 4G network establishes a third multicast session in the multicast area, and send information about the third multicast session to the sender. In this way, indication information includes the information about the third multicast session, that is, the indication information is represented in the foregoing manner f.

Figure 9:
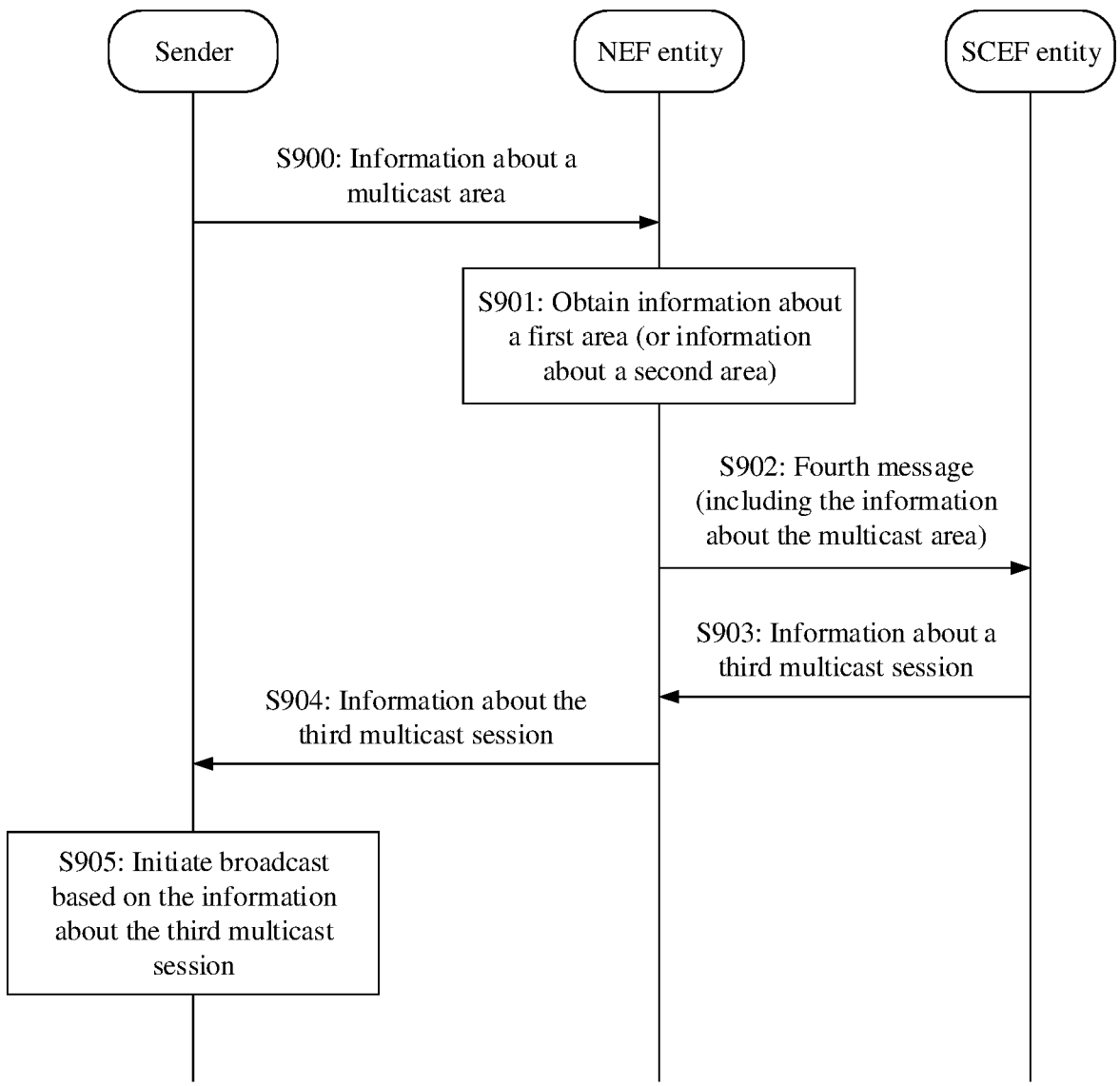
FIG. 9 is a fifth schematic flowchart of a communication method according to an embodiment of this application.

FIG. 9 is a flowchart of another communication method according to an embodiment of this application. In a procedure shown in FIG. 9, indication information is represented in the manner f.

As shown in FIG. 9, the communication method includes the following steps.

S900: A sender sends information about a multicast area to a NEF entity.

For S900, refer to the foregoing descriptions of S500. Details are not described herein again.

S901: The NEF entity obtains, based on the information about the multicast area, information about a first area (or information about a second area).

The NEF entity obtains the information about the first area (or the information about the second area) by using the method 1 or the method 2 described in S501. Details are not described herein again.

S902: The NEF entity sends, to an SCEF entity, a fourth message including the information about the multicast area, to request to establish a third multicast session in the multicast area.

S903: The SCEF entity sends information about the third multicast session to the NEF entity.

After receiving the fourth message, the SCEF entity communicates with another device, to establish the third multicast session. After the third multicast session is successfully established, the SCEF entity obtains the information about the third multicast session, and sends the information about the third multicast session to the NEF entity.

The information about the third multicast session may include a user plane parameter (such as a port number or an IP address) of the third multicast session, a TMGI, and the like.

S904: The NEF entity sends the information about the third multicast session to the sender.

The information about the third multicast session is carried in a response message of a first message.

For example, the response message of the first message is a multicast session establishment response message.

S905: The sender initiates broadcast based on the information about the third multicast session.

Compared with the communication method shown in FIG. 8, in the communication method shown in FIG. 9, the NEF entity directly sends the information about the third multicast session to the sender, thereby effectively reducing an operation of the sender.

In addition, after obtaining the information about the first area (or the information about the second area), the NEF entity may further trigger a 5G network to establish a second multicast session in the first area, and trigger a 4G network to establish a fourth multicast session in the second area. In this way, the NEF entity obtains information about the second multicast session and information about the fourth multicast session, and sends the information about the second multicast session and the information about the fourth multicast session to the sender. In this scenario, the indication information includes the information about the second multicast session and the information about the fourth multicast session, that is, the indication information is represented in the foregoing manner g.

Figure 10:
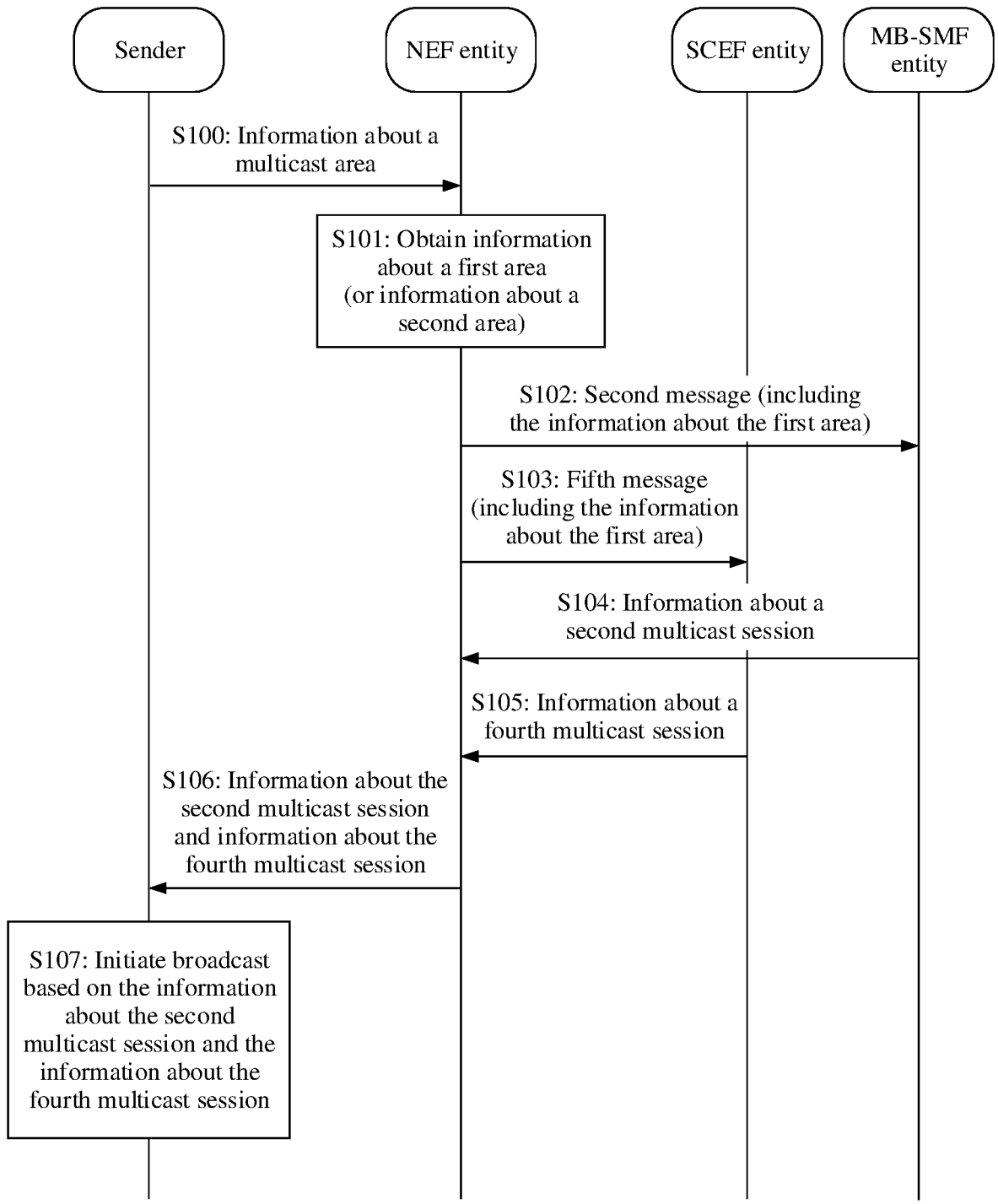
FIG. 10 is a sixth schematic flowchart of a communication method according to an embodiment of this application.

FIG. 10 is a flowchart of another communication method according to an embodiment of this application. In a procedure shown in FIG. 10, indication information is represented in the manner g.

As shown in FIG. 10, the communication method includes the following steps.

S100: A sender sends information about a multicast area to a NEF entity.

For S100, refer to the foregoing descriptions of S500. Details are not described herein again.

S101: The NEF entity obtains, based on the information about the multicast area, information about a first area (or information about a second area).

The NEF entity obtains the information about the first area (or the information about the second area) by using the method 1 or the method 2 described in S501. Details are not described herein again.

S102: The NEF entity sends, to an MB-SMF entity, a second message, to request to establish a second multicast session in the first area.

The second message includes the information about the first area.

S103: The NEF entity sends, to an SCEF entity, a fifth message, to request to establish a fourth multicast session in the first area.

The fifth message includes the information about the first area.

Optionally, the SCEF entity may be replaced with a BMSC entity.

A sequence of performing S102 and S103 is not limited in this embodiment of this application.

S104: The MB-SMF entity sends information about the second multicast session to the NEF entity.

For S104, refer to S803. Details are not described herein again.

S105: The SCEF entity sends information about the fourth multicast session to the NEF entity.

The information about the fourth multicast session includes a user plane parameter (such as a port number or an IP address) of the fourth multicast session, a TMGI, and the like.

S106: The NEF entity sends the information about the second multicast session and the information about the fourth multicast session to the sender.

The information about the second multicast session and the information about the fourth multicast session are carried in a response message of a first message.

For example, the response message of the first message is a multicast session establishment response message.

S107: The sender initiates broadcast based on the information about the second multicast session and the information about the fourth multicast session.

Compared with the communication method shown in FIG. 9, in the communication method shown in FIG. 10, the second multicast session is established, so that transmission of multicast service data can be partially implemented in a 5G network.

The communication methods shown in FIG. 7 to FIG. 10 are applicable to a scenario in which an operator has deployed a multicast system of a 4G network across an entire network.

In actual application, the multicast system of the 4G network may not be deployed in a remote area or a special area (such as a canyon or a tunnel). In this way, after receiving the information about the multicast area, the NEF entity may obtain the information about the first area and information about a third area, and send the information about the first area and the information about the third area to the sender. In this way, the indication information includes the information about the first area and the information about the third area, that is, the indication information is represented in the foregoing manner d.

Figure 11:
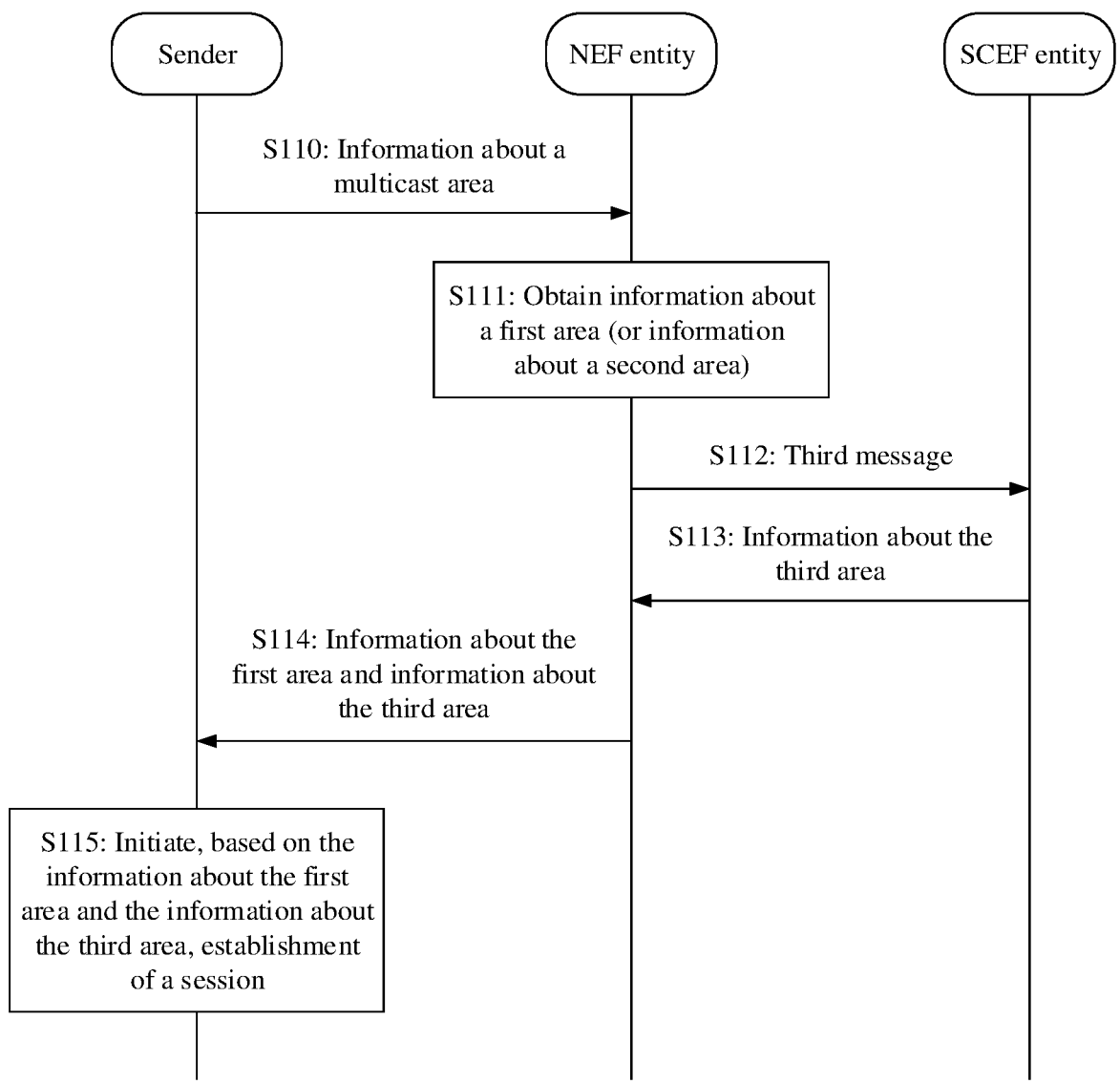
FIG. 11 is a seventh schematic flowchart of a communication method according to an embodiment of this application.

FIG. 11 is a flowchart of another communication method according to an embodiment of this application. In a procedure shown in FIG. 11, indication information is represented in the manner d.

As shown in FIG. 11, the communication method includes the following steps.

S110: A sender sends information about a multicast area to a NEF entity.

For S110, refer to the foregoing descriptions of S500. Details are not described herein again.

S111: The NEF entity obtains, based on the information about the multicast area, information about a first area (or information about a second area).

The NEF entity obtains the information about the first area (or the information about the second area) by using the method 1 or the method 2 described in S501. Details are not described herein again.

S112: The NEF entity sends, to an SCEF entity, a third message, to request to obtain information about a third area.

S113: The SCEF entity sends the information about the third area to the NEF entity.

After receiving the third message, the SCEF entity communicates with another core network device in a 4G network, to obtain the information about the third area. Alternatively, the SCEF entity queries locally pre-stored information about an area supporting a multicast service, to obtain the information about the third area.

S114: The NEF entity sends the information about the first area and the information about the third area to the sender.

The information about the first area and the information about the third area are carried in a response message of a first message.

For example, the response message of the first message is a multicast session establishment failure message.

S115: The sender initiates, based on the information about the first area and the information about the third area, establishment of a session.

The sender may initiate, based on the information about the first area and the information about the third area, establishment of a unicast session of a 5G network in the multicast area; or initiate establishment of a multicast session of the 4G network in the multicast area; or initiate establishment of a multicast session of a 5G network in the first area; or initiate establishment of a multicast session of the 4G network in the third area.

The communication method shown in FIG. 11 is applicable to a scenario in which neither a multicast system of the 4G network nor a multicast system of the 5G network is deployed across an entire network, and the method has relatively high practicability.

The foregoing mainly describes the solutions provided in the embodiments of this application from a perspective of interaction between network elements. It may be understood that, to implement the foregoing functions, each network element such as the first core network device or the sender of the multicast service includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the first core network device and the sender of the multicast service based on the foregoing method examples. For example, each functional module may be divided based on each function, or two or more functions may be integrated in one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 12:
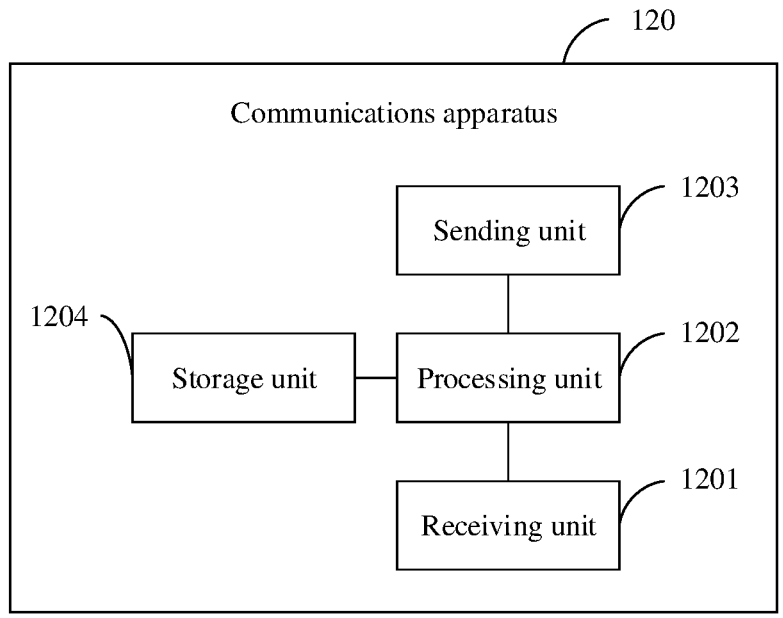
FIG. 12 is a schematic structural diagram of a communications apparatus 120 according to an embodiment of this application.

FIG. 12 is a schematic composition diagram of a communications apparatus 120 according to an embodiment of this application. The communications apparatus 120 may be a first core network device, or may be a part of an apparatus in a first core network device, for example, a chip system in the first core network device. Optionally, the chip system is configured to support the first core network device in implementing a function in the foregoing method embodiments, for example, receiving, sending, or processing data and/or information in the foregoing methods. The chip system includes a chip, and may further include another discrete component or circuit structure.

When each functional module is obtained through division based on each corresponding function, FIG. 12 is a possible schematic structural diagram of the communications apparatus 120 in this embodiment of this application. As shown in FIG. 12, the communications apparatus 120 may include a receiving unit 1201, a processing unit 1202, and a sending unit 1203.

The receiving unit 1201 is configured to support the communications apparatus 120 in performing the receiving operations shown in FIG. 5 to FIG. 11, for example, in S500, S600, S700, S800, S803, S900, S903, S100, S104, S105, S110, and S113, and/or another process used for the technology described in this specification.

The processing unit 1202 is configured to support the communications apparatus 120 in performing the obtaining operations shown in FIG. 5 to FIG. 11, for example, in S501, S601, S701, S704, S801, S901, S106, and S111, and/or another process used for the technology described in this specification.

The sending unit 1203 is configured to support the communications apparatus 120 in performing the sending operations shown in FIG. 5 to FIG. 11, for example, in S502, S602, S702, S703, S705, S802, S804, S904, S102, S103, S106, S112, and S114, and/or another process used for the technology described in this specification.

It should be noted that all related content of the steps in the foregoing method embodiments may be cited in function descriptions of corresponding functional modules. Details are not described herein again. The communications apparatus 120 provided in this embodiment of this application is configured to perform a function of the first core network device in the communication methods shown in FIG. 5 to FIG. 11. Therefore, an effect the same as that of the foregoing communication methods can be achieved.

All related content of the steps in the foregoing method embodiments may be cited in function descriptions of corresponding functional modules. Details are not described herein again. Certainly, the communications apparatus 120 provided in this embodiment of this application includes but is not limited to the foregoing units. For example, the communications apparatus 120 may further include a storage unit 1204. The storage unit 1204 may be configured to store program code and data that are of the communications apparatus 120.

In still another implementation, the communications apparatus 120 shown in FIG. 12 may include a processing module, a communications module, and a storage module. The processing module may integrate functions of the processing unit 1202, the communications module may integrate functions of the receiving unit 1201 and the sending unit 1203, and the storage module may integrate functions of the storage unit 1204.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 120 shown in FIG. 12 may be the communications apparatus shown in FIG. 4.

Another embodiment of this application further provides a computer-readable storage medium. The computer-readable storage medium stores instructions. When the instructions are run on the communications apparatus 120, the communications apparatus 120 performs the steps of the first core network device in the communication methods in the embodiments shown in FIG. 5 to FIG. 11.

In another embodiment of this application, a computer program product is further provided. The computer program product includes computer-executable instructions, and the computer-executable instructions are stored in a computer-readable storage medium. The processor of the communications apparatus 120 may read the computer-executable instructions from the computer-readable storage medium, and the processor executes the computer-executable instructions, so that the communications apparatus 120 performs the steps of the first core network device in the communication methods in the embodiments shown in FIG. 5 to FIG. 11.

Figure 13:
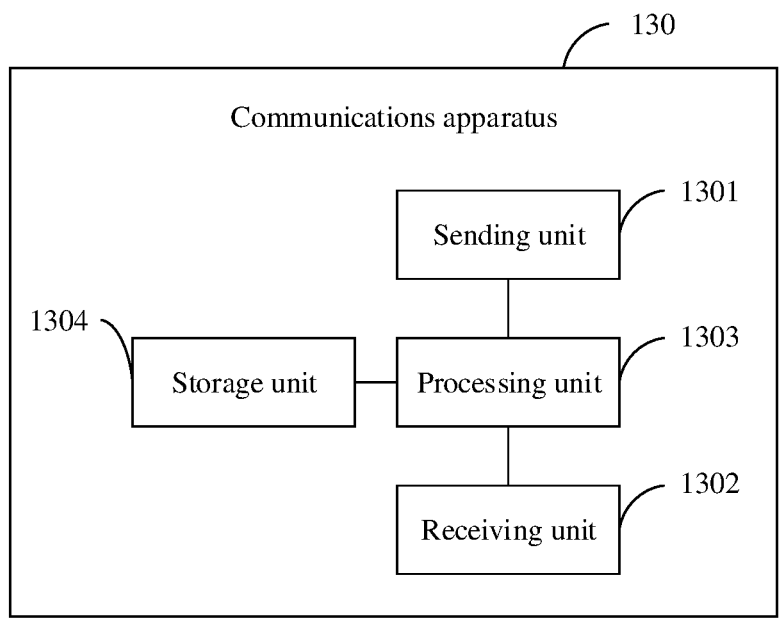
FIG. 13 is a schematic structural diagram of a communications apparatus 130 according to an embodiment of this application.

FIG. 13 is a schematic composition diagram of a communications apparatus 130 according to an embodiment of this application. The communications apparatus 130 may be a sender of a multicast service, or may be a part of an apparatus in a sender of a multicast service, for example, a chip system in the sender of the multicast service. Optionally, the chip system is configured to support the sender of the multicast service in implementing a function in the foregoing method embodiments, for example, receiving, sending, or processing data and/or information in the foregoing methods. The chip system includes a chip, and may further include another discrete component or circuit structure.

When each functional module is obtained through division based on each corresponding function, FIG. 13 is a possible schematic structural diagram of the communications apparatus 130 in this embodiment of this application. As shown in FIG. 13, the communications apparatus 130 may include a sending unit 1301, a receiving unit 1302, and a processing unit 1303.

The sending unit 1301 is configured to support the communications apparatus 130 in performing the receiving operations shown in FIG. 5 to FIG. 11, for example, in S500, S600, S700, S800, S900, S100, and S110, and/or another process used for the technology described in this specification.

The receiving unit 1302 is configured to support the communications apparatus 130 in performing the sending operations shown in FIG. 5 to FIG. 11, for example, in S502, S602, S702, S705, S804, S106, and S114, and/or another process used for the technology described in this specification.

The processing unit 1303 is configured to support the communications apparatus 130 in performing the obtaining operations shown in FIG. 6 to FIG. 11, for example, in S603, S706, S805, S905, S107, and S115, and/or another process used for the technology described in this specification.

It should be noted that all related content of the steps in the foregoing method embodiments may be cited in function descriptions of corresponding functional modules. Details are not described herein again. The communications apparatus 130 provided in this embodiment of this application is configured to perform a function of the sender of the multicast service in the communication methods shown in FIG. 5 to FIG. 11. Therefore, an effect the same as that of the foregoing communication methods can be achieved.

All related content of the steps in the foregoing method embodiments may be cited in function descriptions of corresponding functional modules. Details are not described herein again. Certainly, the communications apparatus 130 provided in this embodiment of this application includes but is not limited to the foregoing units. For example, the communications apparatus 130 may further include a storage unit 1304. The storage unit 1304 may be configured to store program code and data that are of the communications apparatus 130.

In still another implementation, the communications apparatus 130 shown in FIG. 13 may include a processing module, a communications module, and a storage module. The processing module may integrate functions of the processing unit 1303, the communications module may integrate functions of the sending unit 1301 and the receiving unit 1303, and the storage module may integrate functions of the storage unit 1304.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 130 shown in FIG. 13 may be the communications apparatus shown in FIG. 4.

Another embodiment of this application further provides a computer-readable storage medium. The computer-readable storage medium stores instructions. When the instructions are run on the communications apparatus 130, the communications apparatus 130 performs the steps of the sender of the multicast service in the communication methods in the embodiments shown in FIG. 5 to FIG. 11.

In another embodiment of this application, a computer program product is further provided. The computer program product includes computer-executable instructions, and the computer-executable instructions are stored in a computer-readable storage medium. The processor of the communications apparatus 130 may read the computer-executable instructions from the computer-readable storage medium, and the processor executes the computer-executable instructions, so that the communications apparatus 130 performs the steps of the sender of the multicast service in the communication methods in the embodiments shown in FIG. 5 to FIG. 11.

The foregoing descriptions about implementations allow a person skilled in the art to clearly understand that, for the purpose of convenient and brief description, division into the foregoing functional modules is used as an example for illustration. In actual application, the foregoing functions can be allocated to different modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
sending, by a sender of a multicast service, information about a multicast area to a first core network device, wherein the first core network device is a network exposure function which belongs to a first network, and the sender is an application function; and
receiving, by the first core network device, the information about the multicast area, wherein the information about the multicast area comprises geographical area information, a service area identifier, or other information that indicates the area;
obtaining, by the first core network device based on the information about the multicast area, indication information, wherein the indication information indicates that the first network supports the multicast service in a portion of areas of the multicast area;
sending, by the first core network device, the indication information to the sender; and
receiving, by the sender, the indication information.

2. The communication method according to claim 1, wherein the information about the multicast area is carried in a first message, and the first message is used for establishing a first multicast session in the multicast area.

3. The communication method according to claim 1, wherein the indication information comprises information about a second area, and the second area is an area in which the first network does not support the multicast service in the multicast area.

4. The communication method according to claim 3, wherein the indication information further comprises information about a second multicast session, the second multicast session is a multicast session established in a first area, and the second multicast session belongs to the first network.

5. The communication method according to claim 1, wherein
the indication information comprises information about a first area and information about a third area, wherein the first area is an area in which the first network supports the multicast service in the multicast area, and the third area is an area in which a second network supports the multicast service in the multicast area.

6. The communication method according to claim 1, wherein the indication information comprises information about a second multicast session and information about a fourth multicast session, wherein the second multicast session is a multicast session established in a first area, and the second multicast session belongs to the first network; the fourth multicast session is a multicast session established in a second area, and the fourth multicast session belongs to a second network; the first area is an area in which the first network supports the multicast service in the multicast area; and the second area is an area in which the first network does not support the multicast service in the multicast area.

7. A communication system, comprising: a sender of a multicast service and a first core network device, wherein:
the sender is configured to send information about a multicast area to the first core network device, wherein the first core network device is a network exposure function which belongs to a first network, and the sender is an application function, and wherein the information about the multicast area comprises geographical area information, a service area identifier, or other information that indicates the area; and
the first core network device is configured to:
receive the information about the multicast area, and obtain, based on the information about the multicast area, indication information, wherein the indication information indicates that the first network supports the multicast service in a portion of areas of the multicast area; and
send the indication information to the sender; and
the sender, further configured to receive the indication information.

8. The communication system according to claim 7, wherein the information about the multicast area is carried in a first message, and the first message is used for establishing a first multicast session in the multicast area.

9. The communication system according to claim 7, wherein
the indication information comprises information about a second area, and the second area is an area in which the first network does not support the multicast service in the multicast area.

10. The communication system according to claim 9, wherein the indication information further comprises information about a second multicast session, the second multicast session is a multicast session established in a first area, and the second multicast session belongs to the first network.

11. The communication system according to claim 7, wherein
the indication information comprises information about a first area and information about a third area, wherein the first area is an area in which the first network supports the multicast service in the multicast area, and the third area is an area in which a second network supports the multicast service in the multicast area.

12. The communication system according to claim 7, wherein
the indication information comprises information about a second multicast session and information about a fourth multicast session, wherein the second multicast session is a multicast session established in a first area, and the second multicast session belongs to the first network; the fourth multicast session is a multicast session established in a second area, and the fourth multicast session belongs to a second network; the first area is an area in which the first network supports the multicast service in the multicast area; and the second area is an area in which the first network does not support the multicast service in the multicast area.

13. A communication method, comprising:
receiving, a first core network device from a sender of a multicast service, information about a multicast area, wherein the first core network device is a network exposure function which belongs to a first network, and the sender is an application function, and wherein the information about the multicast area comprises geographical area information, a service area identifier, or other information that indicates the area;

obtaining, by the first core network device based on the information about the multicast area, indication information, wherein the indication information indicates that the first network supports the multicast service in a portion of areas of the multicast area; and sending, by the first core network device, the indication information to the sender.

14. The communication method according to claim 13, wherein the information about the multicast area is carried in a first message, and the first message is used for establishing a first multicast session in the multicast area.

15. The communication method according to claim 13, wherein the indication information comprises information about a second area, and the second area is an area in which the first network does not support the multicast service in the multicast area.

16. A non-transitory computer-readable medium storing computer instructions, that when executed by one or more processors, cause the one or more processors to perform the steps of:

receiving, from a sender of a multicast service, information about a multicast area, wherein the information about the multicast area comprises geographical area information, a service area identifier, or other information that indicates the area;

obtaining, based on the information about the multicast area, indication information, wherein the indication information indicates that a first network supports the multicast service in a portion of areas of the multicast area, wherein the sender is an application function; and sending the indication information to the sender.

17. The non-transitory computer-readable medium according to claim 16, wherein the information about the multicast area is carried in a first message, and the first message is used for establishing a first multicast session in the multicast area.

18. The non-transitory computer-readable medium according to claim 16, wherein the indication information comprises information about a second area, and the second area is an area in which the first network does not support the multicast service in the multicast area.

* * * * *